(12) United States Patent
Rigney et al.

(10) Patent No.: US 8,941,939 B1
(45) Date of Patent: Jan. 27, 2015

(54) DISK DRIVE USING VCM BEMF FEED-FORWARD COMPENSATION TO WRITE SERVO DATA TO A DISK

(71) Applicant: Western Digital Technologies, Inc., Irvine, CA (US)

(72) Inventors: Brian P. Rigney, Louisville, CO (US); Jianbin Nie, Fremont, CA (US); Stanley H. Shepherd, Morgan Hill, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/090,732

(22) Filed: Nov. 26, 2013

Related U.S. Application Data

(60) Provisional application No. 61/895,287, filed on Oct. 24, 2013.

(51) Int. Cl.
*G11B 5/02* (2006.01)
*G11B 5/55* (2006.01)

(52) U.S. Cl.
CPC ................................. *G11B 5/5547* (2013.01)
USPC ......... 360/55; 360/69; 360/78.01; 360/78.05; 360/78.06

(58) Field of Classification Search
None
See application file for complete search history.

(56) References Cited

U.S. PATENT DOCUMENTS

| | | | |
|---|---|---|---|
| 5,668,679 A | 9/1997 | Swearingen et al. | |
| 5,754,352 A | 5/1998 | Behrens et al. | |
| 6,005,727 A | 12/1999 | Behrens et al. | |
| 6,014,283 A | 1/2000 | Codilian et al. | |
| 6,021,012 A | 2/2000 | Bang | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,191,906 B1 | 2/2001 | Buch | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |

(Continued)

OTHER PUBLICATIONS

Brian P. Rigney, et. al., U.S. Appl. No. 13/205,072, filed Aug. 8, 2011, 41 pages.

(Continued)

*Primary Examiner* — Muhammad N Edun

(57) ABSTRACT

A disk drive is disclosed comprising a voice coil motor (VCM) configured to actuate a head over a disk. The VCM is controlled to seek the head over the disk during a first seek, and a back electromotive force (BEMF) voltage generated by the VCM during the first seek is measured. Feed-forward compensation is generated based on the measured BEMF voltage, and the VCM is controlled to seek the head over the disk during a second seek using the feed-forward compensation while writing servo data to the disk.

16 Claims, 4 Drawing Sheets

(56) References Cited

U.S. PATENT DOCUMENTS

| | | |
|---|---|---|
| 6,285,521 B1 | 9/2001 | Hussein |
| 6,292,318 B1 | 9/2001 | Hayashi |
| 6,292,320 B1 | 9/2001 | Mason et al. |
| 6,304,407 B1 | 10/2001 | Baker et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,411,453 B1 | 6/2002 | Chainer et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,519,107 B1 | 2/2003 | Ehrlich et al. |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,587,293 B1 | 7/2003 | Ding et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,704,156 B1 | 3/2004 | Baker et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,205 B1 | 5/2004 | Moran et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,943,978 B1 | 9/2005 | Lee |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,799 B1 | 11/2005 | Lee |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,985,316 B1 | 1/2006 | Liikanen et al. |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,002,761 B1 | 2/2006 | Sutardja et al. |
| 7,006,320 B1 | 2/2006 | Bennett et al. |
| 7,016,134 B1 | 3/2006 | Agarwal et al. |
| 7,019,937 B1 | 3/2006 | Liikanen et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,533 B1 | 8/2006 | Shepherd et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,136,253 B1 | 11/2006 | Liikanen et al. |
| 7,145,744 B1 | 12/2006 | Clawson et al. |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,230,786 B1 | 6/2007 | Ray et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,256,956 B2 | 8/2007 | Ehrlich |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |

(56) References Cited

U.S. PATENT DOCUMENTS

| | | |
|---|---|---|
| 7,333,280 B1 | 2/2008 | Lifchits et al. |
| 7,333,286 B2 | 2/2008 | Jung et al. |
| 7,333,290 B1 | 2/2008 | Kupferman |
| 7,339,761 B1 | 3/2008 | Tu et al. |
| 7,365,932 B1 | 4/2008 | Bennett |
| 7,382,564 B1 | 6/2008 | Everett et al. |
| 7,388,728 B1 | 6/2008 | Chen et al. |
| 7,391,583 B1 | 6/2008 | Sheh et al. |
| 7,391,584 B1 | 6/2008 | Sheh et al. |
| 7,405,897 B2 | 7/2008 | Dougherty et al. |
| 7,411,758 B1 | 8/2008 | Cheung et al. |
| 7,414,809 B2 | 8/2008 | Smith et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McComack |
| 7,522,370 B1 | 4/2009 | Sutardja |
| 7,529,055 B1 | 5/2009 | Laks et al. |
| 7,542,225 B1 | 6/2009 | Ding et al. |
| 7,548,392 B1 | 6/2009 | Desai et al. |
| 7,551,387 B2 | 6/2009 | Sun et al. |
| 7,551,390 B1 | 6/2009 | Wang et al. |
| 7,558,016 B1 | 7/2009 | Le et al. |
| 7,561,361 B1 | 7/2009 | Rutherford |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,619,846 B2 | 11/2009 | Shepherd et al. |
| 7,623,313 B1 | 11/2009 | Liikanen et al. |
| 7,626,782 B1 | 12/2009 | Yu et al. |
| 7,630,162 B2 | 12/2009 | Zhao et al. |
| 7,639,445 B2 | 12/2009 | Matsunaga et al. |
| 7,639,446 B2 | 12/2009 | Mizukoshi et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,705 B2 | 3/2010 | Mizukoshi et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,706,100 B2 | 4/2010 | Kawabe |
| 7,710,676 B1 | 5/2010 | Chue |
| 7,715,138 B1 | 5/2010 | Kupferman |
| 7,715,143 B2 | 5/2010 | Bliss et al. |
| 7,728,539 B2 | 6/2010 | Smith et al. |
| 7,729,079 B1 | 6/2010 | Huber |
| 7,733,189 B1 | 6/2010 | Bennett |
| 7,733,588 B1 | 6/2010 | Ying |
| 7,737,793 B1 | 6/2010 | Ying et al. |
| 7,746,592 B1 | 6/2010 | Liang et al. |
| 7,746,594 B1 | 6/2010 | Guo et al. |
| 7,746,595 B1 | 6/2010 | Guo et al. |
| 7,751,144 B1 | 7/2010 | Sutardja |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,852,598 B1 | 12/2010 | Sutardja |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,881,004 B2 | 2/2011 | Kumbla et al. |
| 7,881,005 B1 | 2/2011 | Cheung et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,493,684 B1 | 7/2013 | Ton-That et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |

(56) References Cited

U.S. PATENT DOCUMENTS

| | | |
|---|---|---|
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 2006/0171059 A1 | 8/2006 | Chan et al. |
| 2007/0070538 A1 | 3/2007 | Lau et al. |
| 2007/0076314 A1 | 4/2007 | Rigney |
| 2007/0211367 A1 | 9/2007 | Lau et al. |
| 2007/0279792 A1* | 12/2007 | Tanner .............. 360/75 |
| 2007/0291401 A1* | 12/2007 | Sun et al. ........... 360/75 |
| 2008/0239546 A1* | 10/2008 | Tanner ............. 360/74.1 |
| 2009/0086357 A1 | 4/2009 | Ehrlich |
| 2010/0035085 A1 | 2/2010 | Jung et al. |
| 2011/0181977 A1 | 7/2011 | Kim et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

Aswartha Narayana, et. al., U.S. Appl. No. 13/925,798, filed Jun. 24, 2013, 18 pages.

Jianbin Nie, et. al., U.S. Appl. No. 13/903,197, filed May 28, 2013, 22 pages.

* cited by examiner

DISK DRIVE USING VCM BEMF FEED-FORWARD COMPENSATION TO WRITE SERVO DATA TO A DISK

CROSS-REFERENCE TO RELATED APPLICATIONS

This application claims priority to provisional U.S. Patent Application Ser. No. 61/895,287, filed on Oct. 24, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
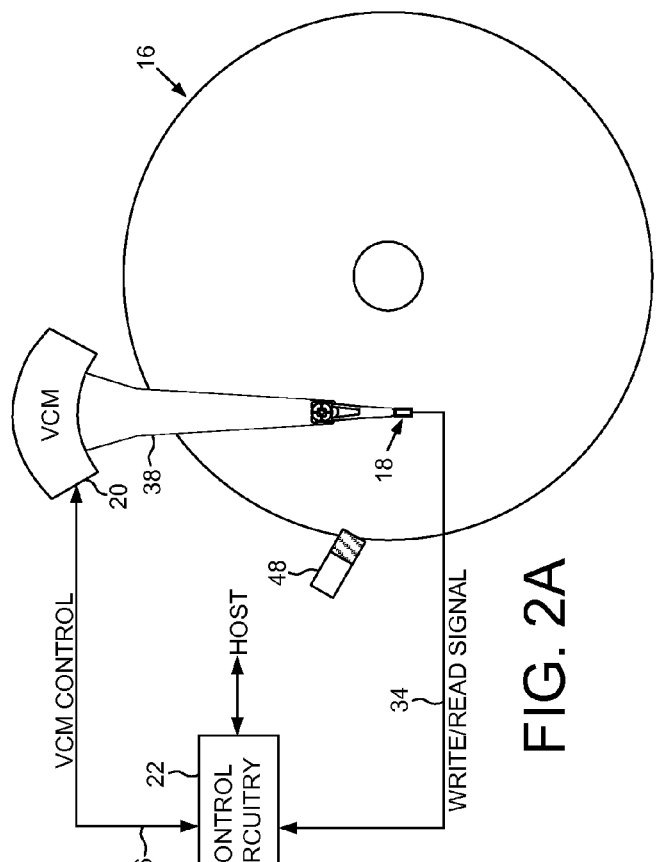
FIG. 2A shows a disk drive according to an embodiment comprising a voice coil motor (VCM) configured to actuate a head over a disk.
Figure 2B:
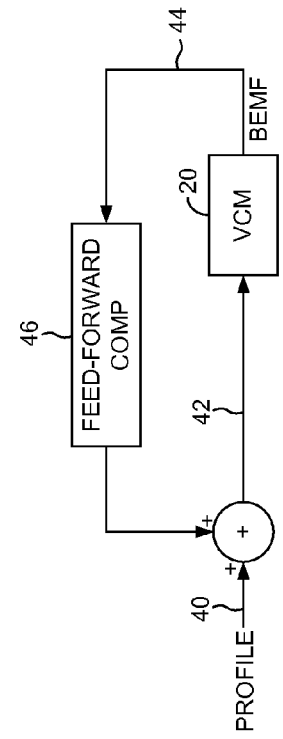
FIG. 2B is a flow diagram according to an embodiment wherein a back electromotive force (BEMF) voltage generated by the VCM is measured during a first seek, feed-forward compensation is generated based on the measured BEMF voltage, and the VCM is controlled to seek the head over the disk during a second seek using the feed-forward compensation while writing servo data to the disk.

FIG. 2A shows a disk drive according to an embodiment comprising a disk 16, a head 18, and a voice coil motor (VCM) 20 configured to actuate the head 18 over the disk 16. The disk drive further comprises control circuitry 22 configured to execute the flow diagram of FIG. 2B wherein the VCM is controlled to seek the head over the disk during a first seek (block 24), and a back electromotive force (BEMF) voltage generated by the VCM is measured during the first seek (block 26). Feed-forward compensation is generated based on the measured BEMF voltage (block 28), and the VCM is controlled to seek the head over the disk during a second seek using the feed-forward compensation (block 30), wherein servo data is written to the disk during the second seek (block 32).

Figure 1:
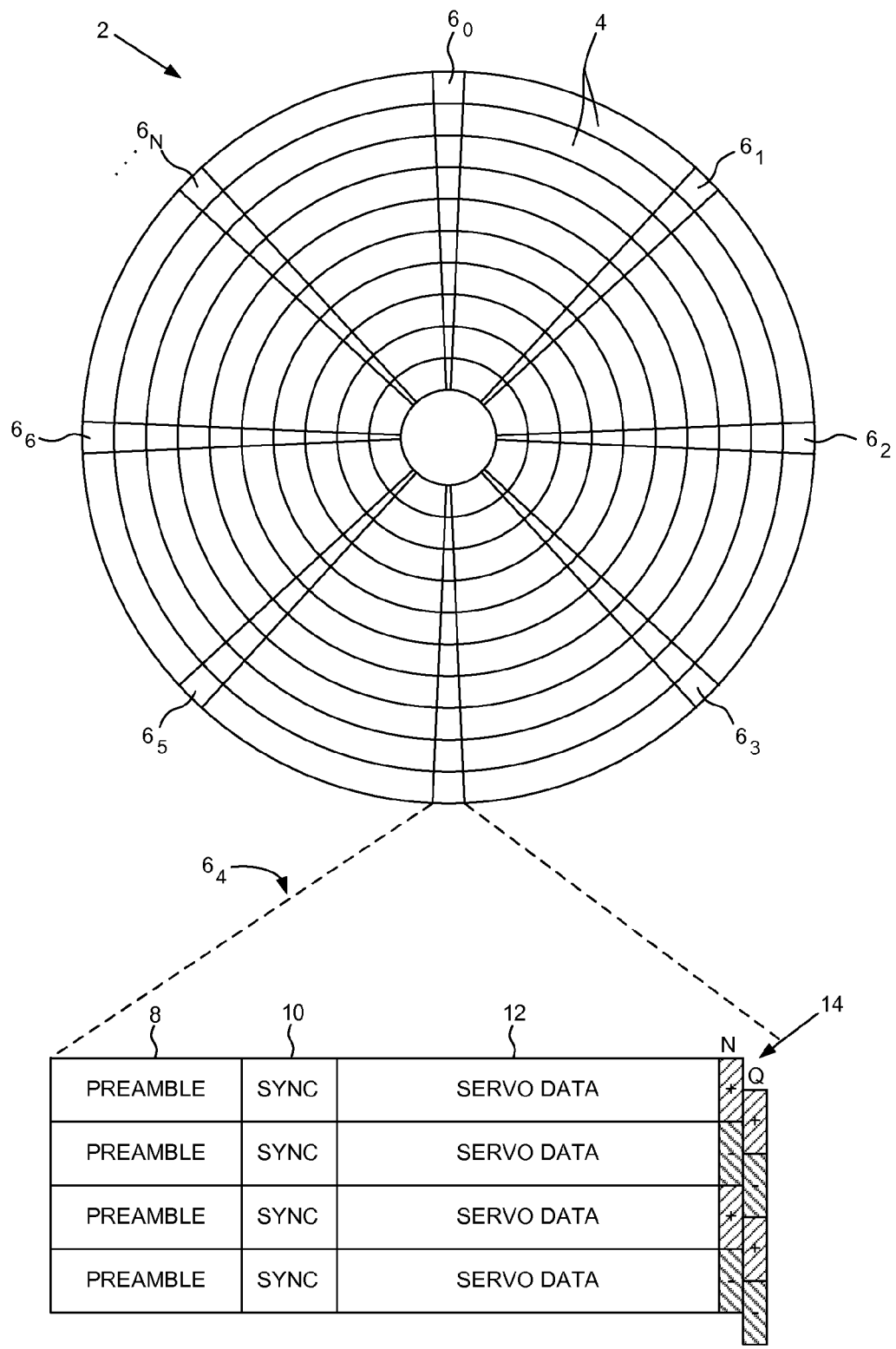
FIG. 1 shows a prior art disk format comprising a plurality of servo tracks defined by servo sectors.

In the embodiment of FIG. 2A, the control circuitry 22 may process a read signal 34 emanating from the head 18 to demodulate servo data written on the disk (e.g., servo sectors as shown in FIG. 1) to generate a position error signal (P ES) representing an error between the actual position of the head and a target position relative to a target track. The control circuitry 22 may process the PES using a suitable servo control system to generate a control signal 36 applied to the VCM 20 which rotates an actuator arm 38 about a pivot in order to actuate the head 18 radially over the disk 16 in a direction that reduces the PES. In one embodiment, the disk drive may also comprise a suitable microactuator, such as a suitable piezoelectric (PZT) element for actuating the head 18 relative to a suspension, or for actuating a suspension relative to the actuator arm 38.

In one embodiment, the servo data read from the disk 16 (e.g., servo sectors) in order to servo the head over the disk during access operations may be self written to the disk using the control circuitry 22 internal to the disk drive. In an embodiment described below, a plurality of spiral servo tracks are first written to the disk 16, and then servo sectors are written to the disk while servoing on the spiral servo tracks. In order to write the spiral servo tracks to the disk 16, at least one bootstrap spiral track is first written to the disk without using position feedback from servo data (i.e., the VCM is controlled open loop with respect to servo data on the disk). Before writing the bootstrap spiral track, feed-forward compensation is generated by evaluating the BEMF voltage generated by the VCM during a calibration seek (where the BEMF voltage represents an estimated velocity of the VCM). The bootstrap spiral track is then written to the disk using the feed-forward compensation.

Figure 2C:
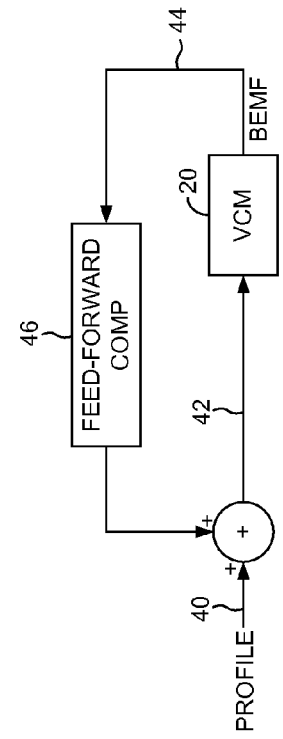
FIG. 2C shows a servo control system for controlling the VCM using the feed-forward compensation according to an embodiment.

FIG. 2C shows a servo control system for controlling the VCM 20 according to an embodiment. During a first seek, a target profile 40 (e.g., an acceleration profile) is used to generate a control signal 42 applied to the VCM 20 and the resulting BEMF voltage 44 generated by the VCM 20 is evaluated to generate feed-forward compensation 46. During a second seek, the target profile 40 is adjusted using the feed-forward compensation 46 in order to generate a compensated control signal 42 applied to the VCM 20. In one embodiment, the target profile 40 is used to generate an uncompensated control signal 42 so as to cause the VCM 20 to move at a constant velocity. However, disturbances affecting the servo control system, such as imperfections in the VCM 20 (e.g., torque profile imperfections, bearing defects, etc.), a seek acceleration induced ring, a latching force of a latching magnet at the end of a seek, or any other disturbance may cause the VCM 20 to vary from the target constant velocity. In one embodiment, the disturbances affecting the servo control system are repeatable, and therefore in one embodiment feed-forward compensation 46 may be learned and then used to compensate for the disturbances, thereby causing the VCM 20 to move at a substantially constant velocity (e.g., while writing a bootstrap spiral track to the disk).

Figure 3:
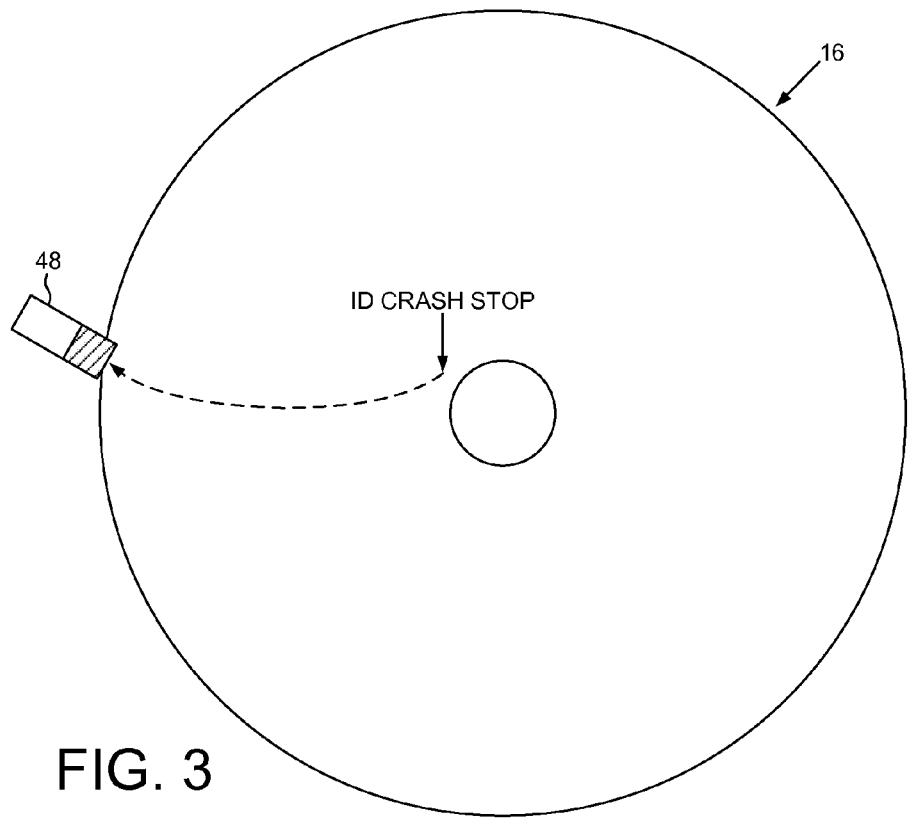
FIG. 3 illustrates an embodiment wherein during the first and second seeks, the VCM moves the head from an inner diameter of the disk to a ramp at an outer diameter of the disk.

FIG. 3 shows an embodiment wherein the control circuitry 22 controls the VCM 20 to press the actuator arm 38 against an inner diameter crash stop so as to position the head 18 near an inner diameter of the disk 16. The control circuitry 22 then seeks the head 18 toward a ramp 48 at the outer diameter of the disk based on a suitable target profile 40 (FIG. 2C). In an embodiment shown in FIG. 4, the target profile comprises an acceleration profile 50 that causes the VCM 20 to accelerate to a target velocity and then remain at the target velocity during the seek. A gain block 52 adjusts a gain of the acceleration profile 50 based on a control signal 54 representing an integrated error signal 56. The error signal 56 is generated by amplifying 57 a difference between a target time 59 and a detected time 61 for the head 18 to contact the ramp 48 during the seek. That is, the gain of the acceleration profile 50 is adapted until the seek time required to seek the head 18 from the inner diameter of the disk 16 to the ramp 48 substantially matches a target seek time.

When the VCM 20 moves at the target constant velocity during the seek, the acceleration of the VCM 20 will be zero. Accordingly, in the embodiment of FIG. 4 the BEMF voltage 44 generated by the VCM 20 is input into block 58 which estimates the acceleration of the VCM 20 by computing a derivative 58 of the BEMF voltage 44. The estimated acceleration 60 is filtered with $G_{VCM}^{-1}$ at block 62 which represents an inverse of the plant representing the VCM 20. That is, block 62 converts the estimated acceleration 60 into a form consistent with the control signal 42 at the input to the VCM 20. The bias control signal 64 output by block 62 is filtered by a low pass filter at block 66, and the signal 68 output by block 66 is scaled by a learning coefficient 70 to generate a filtered bias control signal 72 which represents an update to the feed-forward compensation 46 at sample time k during the seek. Any suitable sample rate may be employed in order to sample the BEMF voltage 44 to periodically generate the filtered bias control signal 72 during the seek.

Figure 4:
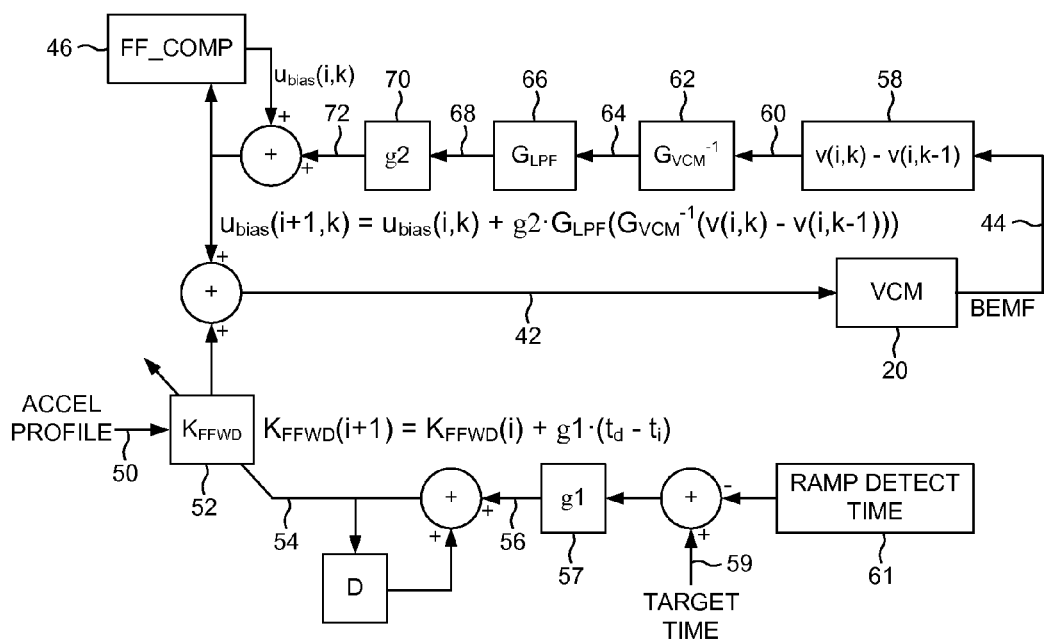
FIG. 4 shows a servo control system for controlling the VCM according to an embodiment, including an adaptive acceleration profile and adaptive feed-forward compensation.

In one embodiment, the control circuitry 22 executes multiple calibration seeks, wherein the feed-forward compensation 46 is adapted during each seek (indexed by i) according to the equation shown in FIG. 4:

$$u_{bias}(i+1,k)=u_{bias}(i,k)+g_2 * G_{LPF}(G_{VCM}^{-1}(v(i,k)-v(i,k-1)))$$

where $u_{bias}(i,k)$ represents the feed-forward compensation 46 generated based on the BEMF voltage 44 measured during each seek, $g_2$ represents the learning coefficient, $G_{LPF}$ represents the low pass filter, $G_{VCM}^{-1}$ represents the inverse of the plant representing the VCM, $v(i,k+1)$ and $v(i,k)$ represent consecutive BEMF voltage measurements during each seek, and $u_{bias}(i+1,k)$ represents the adapted feed-forward compensation. As the feed-forward compensation 46 converges toward the correct values that compensate for the repeatable disturbances affecting the seek, the estimated acceleration 60 of the VCM 20 will trend toward zero. In one embodiment, a number of calibration seeks may be executed until the maximum (or average) of the estimated acceleration 60 during a seek falls below a threshold.

Figure 5A:
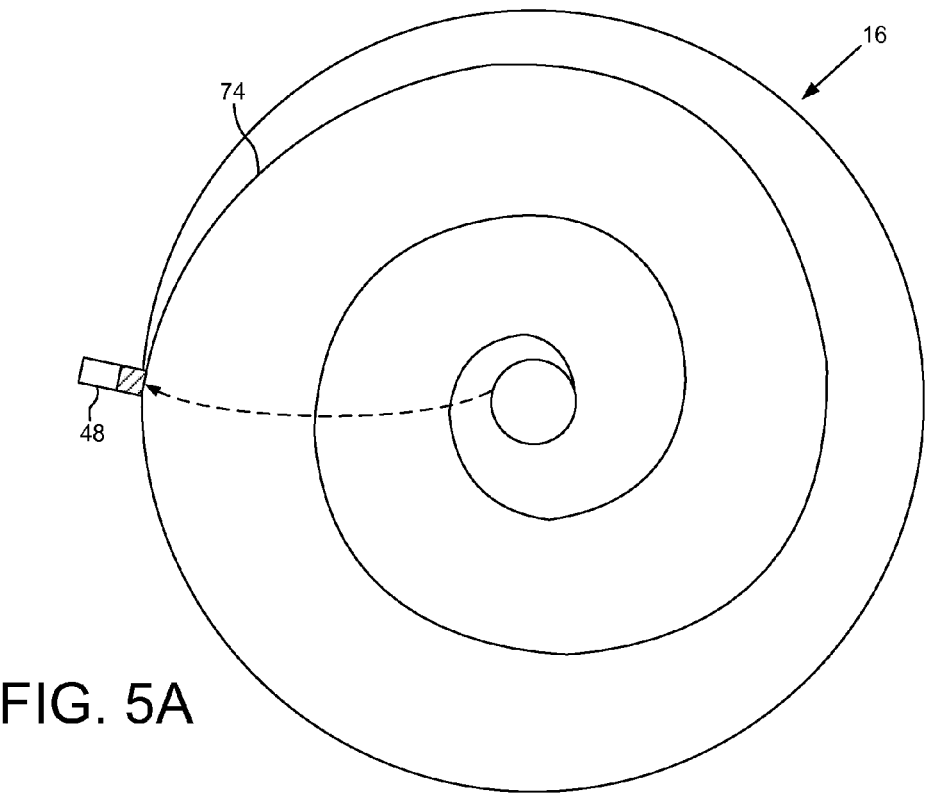
FIG. 5A shows an embodiment wherein the servo data written to the disk during the second seek comprises a first spiral track.

Any suitable servo data may be written to the disk after calibrating the feed-forward compensation 46 by executing the calibration seeks. FIG. 5A shows an embodiment wherein after calibrating the feed-forward compensation 46, the control circuitry 22 executes a seek using the feed-forward compensation 46 to write a bootstrap spiral track 74 from the inner diameter to the outer diameter of the disk 16. The bootstrap spiral track 74 may comprise any suitable format, wherein in one embodiment the bootstrap spiral track 74 comprises a high frequency signal interrupted periodically by sync marks.

Figure 5B:
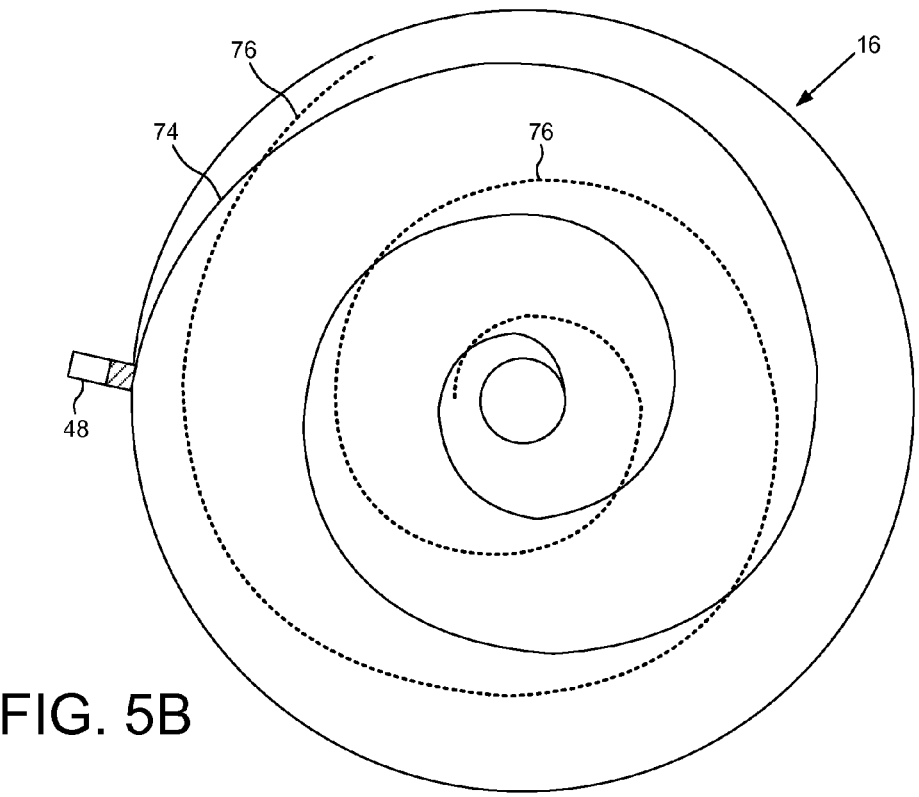
FIG. 5B shows an embodiment wherein a second spiral track is written to the disk while servoing on the first spiral track.

After writing one or more of the bootstrap spiral tracks 74, in one embodiment shown in FIG. 5B one or more spiral servo tracks 76 is written to the disk 16 while servoing on the bootstrap spiral track 74. In the embodiment of FIG. 5B, the spiral servo track 76 is written from the outer diameter to the inner diameter of the disk 16, wherein a servo state for the head 18 (e.g., position) is updated at each bootstrap spiral track crossing. That is, in one embodiment the bootstrap spiral track 74 improves the accuracy of writing the spiral servo track 76 by providing feedback to the servo control system while writing the spiral servo track 76. In one embodiment, the feed-forward compensation 46 may also be used to improve the seek performance while writing the spiral servo track 76 in addition to processing the servo information provided by each bootstrap spiral track 74 crossing. In one embodiment, the spiral servo track 76 may be used as a final servo pattern that defines servo tracks used to access the disk 16 during normal access operations, and in another embodiment, the spiral servo track 76 may be processed to write a set of concentric servo sectors such as shown in FIG. 1 in order to define the servo tracks. In yet another embodiment, the concentric servo sectors may be written by servoing on the bootstrap spiral tracks 74 (i.e., without writing the spiral servo tracks 76).

In one embodiment, the control circuitry 22 may write multiple bootstrap spiral tracks 74 to the disk 16 by seeking using the feed-forward compensation 46. After writing each bootstrap spiral track, the difference between the target seek time and the detected seek time may be used to further update the gain 52 of the acceleration profile 50 in FIG. 4. In addition, the feed-forward compensation 46 may be further updated during each seek while writing each bootstrap spiral track 74 to the disk. If the feed-forward compensation 46 is used when writing the spiral servo tracks 76 as shown in FIG. 5B, the feed-forward compensation 46 may be further updated during each seek based on the estimated acceleration 60 output by block 58 of FIG. 4 and/or by estimating the acceleration of the VCM 20 based on the servo information extracted at each bootstrap spiral track 74 crossing.

Referring again to the servo control system shown in FIG. 4, the BEMF voltage 44 representing the velocity of the VCM 20 may be sampled at any suitable sample rate in order to update the feed-forward compensation 46 at any suitable frequency during the seek. In one embodiment, an inductance of the VCM 20 induces a transient in the BEMF voltage 44 each time the control signal 42 is updated with the next feed-forward compensation 46 at each sample instance. Accordingly, in one embodiment the sample period for sampling the BEMF voltage 44 may be configured long enough so that the transient in the BEMF voltage 44 caused by the inductance of the VCM has sufficiently settled before the next sampling. In another embodiment, the inductive effect of the VCM may be modeled and canceled from the sampled BEMF voltage 44 so that a higher sample rate may be employed.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a disk;
   a head;
   a voice coil motor (VCM) configured to actuate the head over the disk; and
   control circuitry configured to:
      control the VCM to seek the head over the disk during a first seek;
      measure a back electromotive force (BEMF) voltage generated by the VCM during the first seek;
      generate feed-forward compensation based on the measured BEMF voltage;
      control the VCM to seek the head over the disk during a second seek using the feed-forward compensation; and
      write servo data to the disk during the second seek.

2. The disk drive as recited in claim 1, wherein the control circuitry is further configured to:
   control the VCM based on a target profile during the first seek;
   measure a seek time of the first seek; and
   adjust the target profile based on the measured seek time.

3. The disk drive as recited in claim 1, wherein the control circuitry is further configured to:
   periodically measure the BEMF voltage during the first seek to generate BEMF samples;
   compute a derivative of the BEMF samples to generate a measured acceleration of the VCM; and
   generate the feed-forward compensation based on the measured acceleration of the VCM.

4. The disk drive as recited in claim 3, wherein the control circuitry is further configured to:
   filter the measured acceleration with an inverse of a plant representing the VCM to generate a bias control signal; and
   generate the feed-forward compensation based on the bias control signal.

5. The disk drive as recited in claim 4, wherein the control circuitry is further configured to:
   filter the bias control signal with a low pass filer to generate a filtered bias control signal; and
   generate the feed-forward compensation based on the filtered bias control signal.

6. The disk drive as recited in claim 1, wherein after executing the first seek and prior to executing the second seek the control circuitry is further configured to:
   control the VCM to seek the head over the disk during a third seek using the feed-forward compensation;
   adapt the feed-forward compensation based on the BEMF voltage measured during the third seek.

7. The disk drive as recited in claim 6, wherein the control circuitry is further configured to adapt the feed-forward compensation based on:

$$u_{bias}(i+1,k) = u_{bias}(i,k) + g_2 * G_{LPF}(G_{VCM}^{-1}(v(i,k) - v(i,k-1)))$$

where:
$u_{bias}(i,k)$ represents the feed-forward compensation generated based on the BEMF voltage measured during the first seek;
$g_2$ represents a learning coefficient;
$G_{LPF}$ represents a low pass filter;
$G_{VCM}^{-1}$ represents an inverse of a plant representing the VCM;
$v(i,k+1)$ and $v(i,k)$ represent consecutive BEMF voltage measurements during the third seek; and
$u_{bias}(i+1,k)$ represents the adapted feed-forward compensation.

8. The disk drive as recited in claim 1, wherein the servo data comprises a spiral track written substantially over an entire radius of the disk during the second seek.

9. A method of operating a disk drive, the method comprising:

controlling a voice coil motor (VCM) to seek a head over a disk during a first seek;

measuring a back electromotive force (BEMF) voltage generated by the VCM during the first seek;

generating feed-forward compensation based on the measured BEMF voltage;

controlling the VCM to seek the head over the disk during a second seek using the feed-forward compensation; and writing servo data to the disk during the second seek.

10. The method as recited in claim 9, further comprising:

controlling the VCM based on a target profile during the first seek;

measuring a seek time of the first seek; and adjusting the target profile based on the measured seek time.

11. The method as recited in claim 9, further comprising:

periodically measuring the BEMF voltage during the first seek to generate BEMF samples;

computing a derivative of the BEMF samples to generate a measured acceleration of the VCM; and generating the feed-forward compensation based on the measured acceleration of the VCM.

12. The method as recited in claim 11, further comprising:

filtering the measured acceleration with an inverse of a plant representing the VCM to generate a bias control signal; and generating the feed-forward compensation based on the bias control signal.

13. The method as recited in claim 12, further comprising:

filtering the bias control signal with a low pass filer to generate a filtered bias control signal; and generating the feed-forward compensation based on the filtered bias control signal.

14. The method as recited in claim 9, further comprising:

after executing the first seek and prior to executing the second seek, controlling the VCM to seek the head over the disk during a third seek using the feed-forward compensation; and adapting the feed-forward compensation based on the BEMF voltage measured during the third seek.

15. The method as recited in claim 14, further comprising adapting the feed-forward compensation based on:

$$u_{bias}(i+1,k)=u_{bias}(i,k)+g_2 *G_{LPF}(G_{VCM}^{-1}(v(i,k)-v(i,k-1)))$$

where:

$u_{bias}(i,k)$ represents the feed-forward compensation generated based on the BEMF voltage measured during the first seek;

$g_2$ represents a learning coefficient;

$G_{LPF}$ represents a low pass filter;

$G_{VCM}^{-1}$ represents an inverse of a plant representing the VCM;

$v(i,k+1)$ and $v(i,k)$ represent consecutive BEMF voltage measurements during the third seek; and $u_{bias}(i+1,k)$ represents the adapted feed-forward compensation.

16. The method as recited in claim 9, wherein the servo data comprises a spiral track written substantially over an entire radius of the disk during the second seek.

* * * * *